ERNST MEIER
*INVENTOR.*

Aug. 13, 1968   E. MEIER   3,396,824
DISK BRAKE WITH AXIAL DISPLACEMENT LIMIT MEANS FOR BRAKE SHOES
Filed Oct. 24, 1966   3 Sheets-Sheet 2
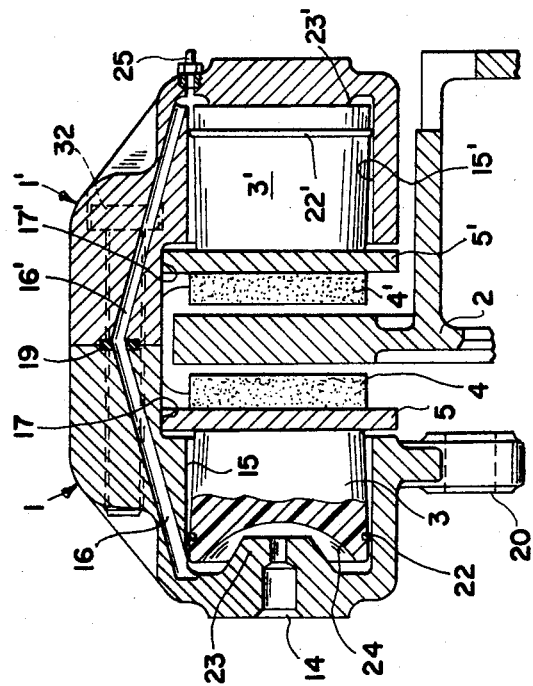
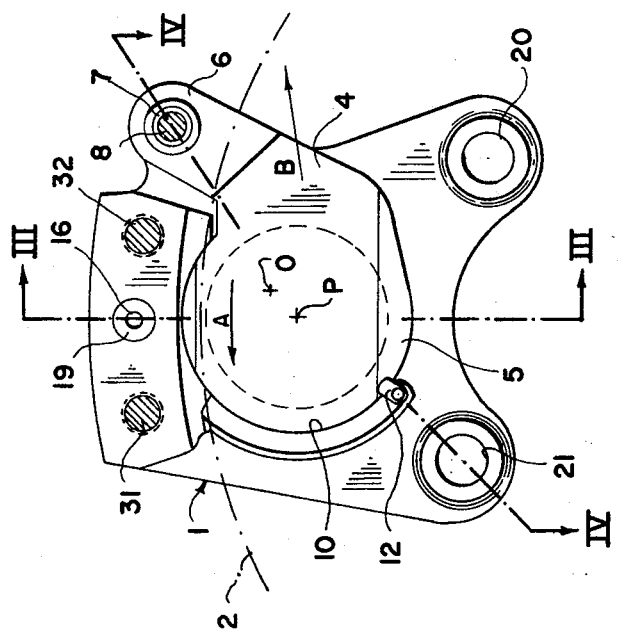
ERNST MEIER
*INVENTOR.*
BY  *Ross & Masters*

United States Patent Office 3,396,824
Patented Aug. 13, 1968

3,396,824
DISK BRAKE WITH AXIAL DISPLACEMENT
LIMIT MEANS FOR BRAKE SHOES
Ernst Meier, Frankfurt, Germany, assignor to Alfred
Teves, Frankfurt am Main, Germany, a corporation of
Germany
Filed Oct. 24, 1966, Ser. No. 589,000
Claims priority, application Germany, Dec. 4, 1965,
T 29,944; Mar. 25, 1966, T 30,759
5 Claims. (Cl. 188—73)

ABSTRACT OF THE DISCLOSURE

Disk brake with two brake shoes held in position within a yoke-shaped housing by a removable pin whose withdrawal facilitates extraction of these shoes from the housing; the pin is surrounded by a tubular spring which interconnects the brake shoes and forms resilient stops to limit the axial displacement thereof toward the respective disk faces.

My present invention relates to a disk brake of the type wherein a pair of brake shoes, each with the usual brake lining, are movable under fluid pressure against opposite faces of a disk rotating with an element to be decelerated, e.g. a wheel axle of an automotive vehicle.

The general object of my invention is to provide a brake of this character which is of compact and mechanically simple construction.

A more particular object of this invention is to provide a disk brake of the type referred to wherein a withdrawal of the brake shoes, for purposes of inspection, relining or replacement, requires only the removal of a single pin normally supporting these shoes.

This object is realized, pursuant to the present invention, by the provision of a yoke-shaped housing which has two flanks straddling the disk and forming a pair of aligned cylinders for the fluid-operated (usually hydraulically actuated) pistons; each housing flank has a slot adjacent the proximal disk face on the upstream side, as viewed in a preferred direction of rotation of the disk which in the case of an automotive vehicle corresponds to the forward direction of the wheel axle, this slot enabling the insertion of a corresponding brake shoe into the respective housing part. At the side remote from the slot, i.e., on the downstream side as viewed in the preferred direction of rotation, each housing flank forms an abutment for the brake shoe engageable with it, preferably at more than one point; the bight portion of the housing yoke may also make contact with the shoe, and a further point of engagement is provided by means of a lateral extension or arm of the shoe which is traversed by a removable guide pin spanning the two housing flanks at the upstream side, the shoe being thus supported at three or more points while being axially slidable along the pin toward the confronting disk face. Upon removal of the guide pin, each shoe can be laterally withdrawn by its arm through the corresponding housing slot in a direction generally tangential to the disk and opposite the preferred direction of disk rotation.

Advantageously, the abutment on the downstream side of each housing flank is constituted by an arcuate shoulder which nearly closes the housing at that side, leaving only a gap for the passage of the disk periphery, and which is engaged substantially throughout its length by a correspondingly curved rear edge of the brake shoe.

In order to limit the advance of the brake shoes toward the disk, upon extensive wear of the associated brake linings, I prefer to provide a resilient stop member centrally along the guide pin and a fixed axial stop for the rear portion of each brake shoe remote from that pin.

I have also discovered that it is desirable to offset the geometrical centers of the brake linings radially outwardly from the centers of their pistons, in order that the points of greatest contact pressure should lie on a relatively small radius while only a lesser pressure is exerted upon those parts of the lining where the disk radius and therefore the relative speed of lining and disk is the greatest. This arrangement, accordingly, reduces the wear of the lining and prolongs its service life. By the same token, the lining may be extended laterally onto the brake-shoe arms which are traversed by the guide pin and which are also only under reduced pressure from the pistons.

In accordance with another feature of my invention, I prefer to construct the pistons from synthetic plastic material in order to reduce the weight and the cost of the assembly. I have found that such pistons should not be cylindrical, as is generally true of conventional metallic pistons, but should be substantially frustoconical, tapering from a larger face remote from the disk to a smaller face confronting the disk.

Since the face proximal to the disk heats up more than the opposite face, it will be able to expand against the cylinder wall without jamming the piston in a forward position. The larger piston face may be centrally recessed so as to yield inwardly when fluid pressure is removed; in order to reduce the dead space within the cylinder, the latter may have its bottom formed with a boss extending into the recess of the piston.

The above and other objects, features and advantages of my invention will become more readily apparent from the following detailed description of a preferred embodiment, given with reference to the accompanying drawing in which:

FIG. 2 is a cross-sectional view taken on the line II—II of FIG. 1;

FIG. 3 is a cross-sectional view taken on the line III—III of FIG. 2; and

Figure 1:
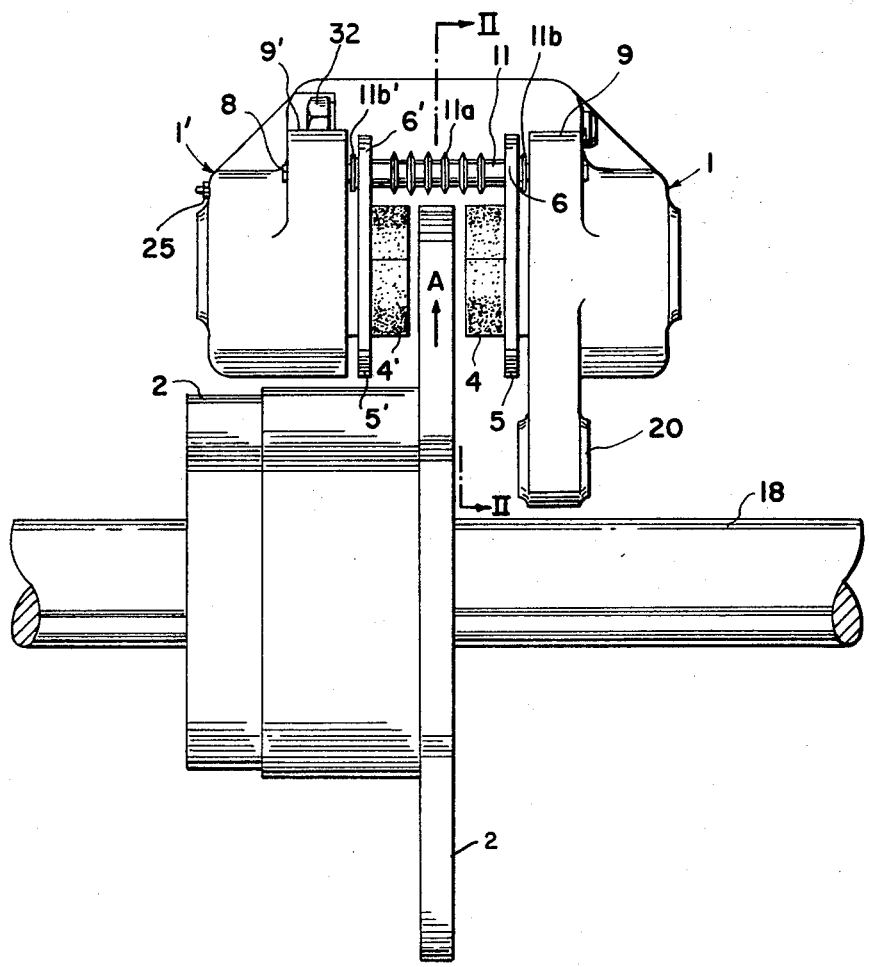
FIG. 1 is a side-elevational view of a disk brake according to the invention.

In the drawing I have shown a disk 2 keyed, in the usual manner, to a rotating shaft 18 to be decelerated, e.g., a wheel axle of an automotive vehicle not further illustrated. Straddling the periphery of disk 2 is a brake housing split into halves 1 and 1' that are fastened together by bolts 31 and 32 to form a rigid yoke whose flanks, represented by the housing portions 1 and 1', straddle the periphery of disk 2. Lugs 20 and 21 on housing portion 1 serve to fasten the housing to the chassis, not shown, of the vehicle. Housing portions 1, 1' form two aligned hydraulic cylinders 15, 15' with open ends confronting opposite surfaces of a peripheral zone of disk 2. The blind opposite ends or bottoms of cylinders 15, 15' are provided with internal bosses 23, 23', boss 23 being traversed by an inlet port 14 for hydraulic fluid connected with the pedal-controlled piston of an associated master cylinder, not shown, as is the practice in automotive vehicles. Each housing half 1, 1' is provided with a bore 16, 16' inclined at a small angle to the horizontal, as well as to the axis of disk 2, these bores extending from the vicinity of the closed ends of cylinders 15, 15' to a junction within a packing ring 19 at the parting surface of the two halves 1, 1' whereby a pressure-equalizing channel is formed which also dispenses with the need for a second fluid inlet at boss 23'. The low rise of channel 16, 16' permits the placement of an air-bleeding valve 25 at the zenith of one of the cylinders, here cylinder 15', rather than at the top of the channel as would otherwise be necessary.

Cylinders 15, 15' slidably receive a pair of pistons 3, 3' of synthetic resin which are of frustoconical configuration and have their larger faces, remote from disk 2, provided with a central recess 24; their smaller faces are planar and parallel to the faces of disk 2 respectively confronted thereby. A sealing ring 22, 22' (e.g., of rubber) girds the somewhat flexible large-base periphery of each piston to insure fluidtight contact with the cylinder, the tapered and recessed shape of the pistons preventing any locking of the pistons in forward position even upon prolonged frictional heating.

Between the smaller faces of pistons 3, 3' and disk 2 there are interposed a pair of brake shoes 5, 5' whose arcuate rear edges, as viewed in the direction of normal disk rotation indicated by arrow A, rest against conforming abutments 10, 10' of housing portions 1, 1' centered on the piston axis P. In the vertical radial plane of shaft 18, i.e., in the common axial plane of disk 2 and cylinders 15, 15', the brake shoes 5, 5' bear on inner surfaces 17, 17' of the housing yoke which thus provides a second point of support. A pair of arms 6, 6' form integral lateral extensions of these brake shoes passing outwardly through an open side of housing 1, 1' on the upstream side of preferential disk rotation (arrow A) which corresponds to the forward motion of the vehicle; the projecting ends of these arms form a pair of aligned eyes 7, 7'. Brake shoes 5, 5' are equipped with brake linings 4, 4' whose geometrical centers O are offset outwardly and forwardly (i.e., against the direction of rotation A) from the piston axis P whereby the points of greatest hydraulic pressure lie on a smaller radius of disk 2 than the major parts of the brake linings so that the wear of these linings will be more uniform than with a centered arrangement. The linings 4, 4' also extend laterally over part of the arms 6, 6', thereby providing added wearing surfaces on the side which is subject to the direct impact of the oncoming disk.

A pin 8 parallel to shaft 18 is received with frictional fit in external lugs or projections 9, 9' of housing portions 1, 1' and slidably traverses the eyes 7, 7', thereby engaging the brake shoes 5, 5' at a third point of support with freedom of parallel displacement in axial direction of disk 2. Axial withdrawal of pin 8 removes the only positive restraint upon an extraction of the brake shoes 5, 5' through the open housing side, e.g., for the purpose of relining, in the direction of arrow B (FIG. 2) which is substantially tangential to disk 2 and corresponds to the general direction of arms 6, 6'.

Figure 4:
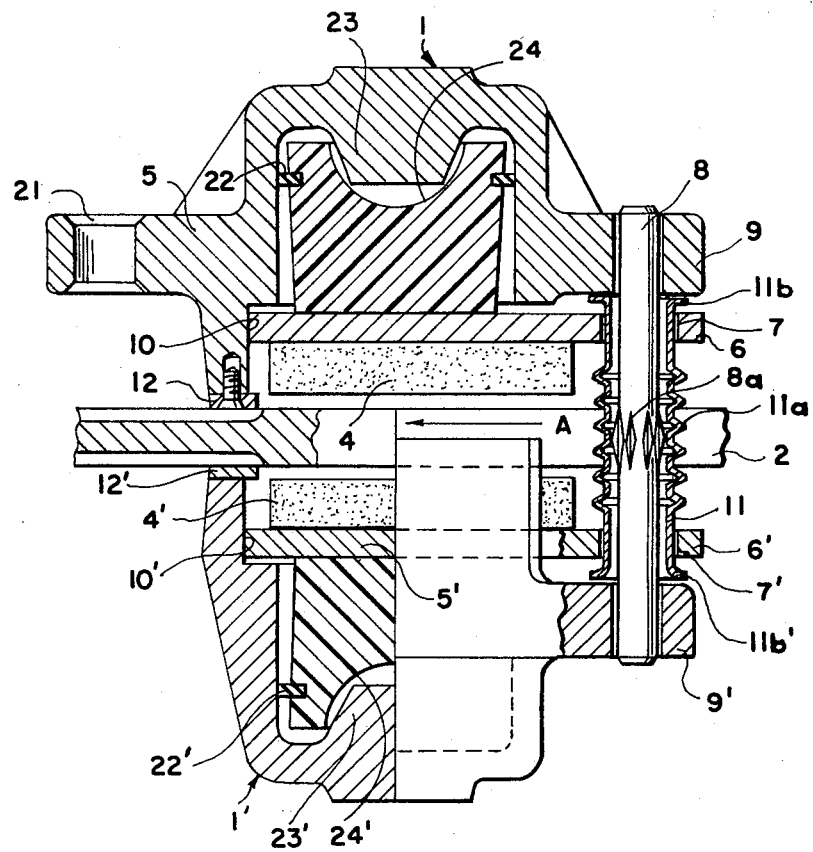
FIG. 4 is a cross-sectional view taken on the line IV—IV of FIG. 2.

An elongated tubular spring 11 surrounds the pin 8 and extends therealong through eyes 7, 7' toward the lugs 9, 9'. The central part of the tube 11 is corrugated at 11a to provide a resilient stop between arms 6, 6' for limiting the approach of brake shoes 5, 5' toward the disk 2. There is sufficient clearance between the deformations 11a and the arms 6, 6' in the initial position of the latter (see FIG. 4) to allow free displacement of the brake shoes and linings under hydraulic pressure, with progressively increasing piston strokes, until the linings 4, 4' are worn down to a fraction of their original thickness.

The two arcuate shoulders 10, 10' of housing portions 1, 1' on the downstream side are spaced apart only sufficiently to clear the disk 2 and are provided with stops 12, 12' which overlie exposed parts of the brake shoes 5, 5' to form a positive inward stop therefor at locations closer to the disk than are the ends of spring portions 11a.

When hydraulic pressure is applied through port 14 to cylinders 15, 15', pistons 3, 3' are urged toward each other to clamp a peripheral zone of disk 2 between the linings 4, 4' of the associated brake shoes 5, 5'. As long as the disk rotates in its preferred sense of rotation (arrow A), shoes 5 and 5' are strongly supported by the rear shoulders 10, 10' of the housing with secondary support at bight surfaces 17, 17' and eyes 7, 7'; in the event of braking action during reverse rotation (backing), which generally occurs at low speeds, the mechanical strength of pin 8 will suffice to prevent dislodgment of the brake shoes. As the linings 4, 4' are eroded in use, brake shoes 5, 5' eventually come into contact with stops 12, 12' and, a little earlier, with spring portions 11a; since the latter are relatively remote from piston axis P, the hydraulic force available in a far-out piston position will not suffice to tilt the shoes about the stops 12, 12' against the spring force in a manner which would allow any part of these shoes to touch the disk. The driver, feeling the resistance of spring portions 11a at this terminal stage, will be apprised of the fact that the brake requires relining.

The midsection of pin 8 has a set of ribs 8a in frictional contact with the annular corrugations 11a of spring 11 which is limitedly axially displaceable between the lugs 9 and 9' to adjust itself to possible uneven wear of the two brake linings 4 and 4'. It will be apparent that the tubular spring 11, with its flanged extremities 11b and 11b', serves as a means for holding the two brake shoes 5, 5' in mutual alignment during their insertion into the housing, before introduction of the pin 8.

Departures from the structure specifically described and illustrated, readily apparent to persons skilled in the art, are, of course, deemed to come within the spirit and scope of my invention as defined in the appended claims.

I claim:

1. A brake comprising a disk rotatable about an axis; a yoke-shaped housing with two flanks straddling the periphery of said disk and forming two aligned cylinders opposite respective faces thereof, each of said flanks having a slot adjacent the proximal disk face on the upstream side, a projection adjacent said slot, and abutment means on the downstream side as viewed in a preferred direction of rotation of said disk; a pin parallel to said axis removably received in said projections and spanning said flanks on said upstream side just beyond the periphery of said disk; a resilient tubular member slidably surrounding said pin between said projections; a pair of brake shoes each extending laterally into said housing alongside said respective faces, said shoes bearing against said abutment means of the respective housing flank and being provided with lateral extensions traversed by said tubular member with freedom of sliding displacement parallel to said axis, said shoes and said member being jointly withdrawable from said housing through said slot, upon removal of said pin, in a direction generally tangential to said disk and opposite said preferred direction of rotation; a pair of brake linings respectively carried on said shoes and confronting said faces; a pair of pistons in said cylinders displaceable by fluid pressure toward said disk for driving said shoes with their brake linings into contact with the confronting disk faces; and stop means on said tubular member between said extensions for resisting axial displacement of said brake shoes toward said disk beyond a predetermined stroke length.

2. A brake as defined in claim 1 wherein said tubular member is provided with a plurality of transverse corrugations forming said stop means.

3. A brake as defined in claim 2 wherein said pin has a set of longitudinal ribs frictionally engaging said corrugations from within, said tubular member being limitedly movable between said projections against the frictional resistance of said ribs and corrugations.

4. A brake as defined in claim 1 wherein said abutment means forms a fixed axial stop remote from said pin limiting the displacement of the corresponding brake shoe toward said disk, said resilient stop means being positioned for engagement by the corresponding brake shoe prior to contact thereof with said axial stop.

5. A brake as defined in claim 1 wherein said housing has a bight portion in contact with said shoes between said abutment means and said pin.

References Cited

UNITED STATES PATENTS

| | | | |
|---|---|---|---|
| 2,657,772 | 11/1953 | Chamberlain | 188—1 |
| 2,937,722 | 5/1960 | Ruet | 188—73 |
| 3,183,999 | 5/1965 | Buyze et al. | 92—248 X |
| 3,243,017 | 3/1966 | Kleinstuck | 188—73 |
| 3,265,167 | 8/1966 | Yazell | 188—251 |
| 3,285,371 | 11/1966 | Cadiou | 188—73 |

FOREIGN PATENTS

| | | |
|---|---|---|
| 935,995 | 9/1963 | Great Britain. |
| 956,559 | 4/1964 | Great Britain. |

MILTON BUCHLER, *Primary Examiner.*

GEORGE E. HALVOSA, *Assistant Examiner.*